US008621956B2

(12) United States Patent
Simeonidis et al.

(10) Patent No.: US 8,621,956 B2
(45) Date of Patent: Jan. 7, 2014

(54) SEAT ACTUATOR

(75) Inventors: Antonios Simeonidis, Wuppertal (DE);
Karsten Wehling, Burscheid (DE);
Leonid Fissler, Leverkusen (DE); Jorg Mantke, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 994 days.

(21) Appl. No.: 12/377,821

(22) PCT Filed: Aug. 15, 2007

(86) PCT No.: PCT/EP2007/007198
§ 371 (c)(1),
(2), (4) Date: Jun. 2, 2009

(87) PCT Pub. No.: WO2008/019835
PCT Pub. Date: Feb. 21, 2008

(65) Prior Publication Data
US 2010/0186539 A1 Jul. 29, 2010

(30) Foreign Application Priority Data

Aug. 17, 2006 (DE) .......................... 10 2006 038 649
Dec. 8, 2006 (DE) .......................... 10 2006 058 388

(51) Int. Cl.
*F16C 1/10* (2006.01)
*B60N 2/02* (2006.01)
*B60N 2/20* (2006.01)
*A47C 1/0355* (2013.01)
*B60N 2/36* (2006.01)

(52) U.S. Cl.
CPC ................ *F16C 1/10* (2013.01); *A47C 1/0355* (2013.01); *B60N 2/366* (2013.01)
USPC .... 74/501.6; 74/502.4; 74/502.6; 74/501.5 R; 74/502; 297/85 C; 297/378.13

(58) Field of Classification Search
USPC ............ 297/85 C, 378.13; 296/63; 74/502.4, 74/502.6, 501.5 R, 502, 493, 501.6; 292/336.3
IPC ................ A47C 1/023; B60N 2/08,2/44, 2/015, B60N 2/58
See application file for complete search history.

(56) References Cited

U.S. PATENT DOCUMENTS 4,580,822 A * 4/1986 Fukumoto .................. 292/336.3
4,711,493 A * 12/1987 Schrom et al. ........... 297/378.13

(Continued)

FOREIGN PATENT DOCUMENTS

DE 8804606 U1 8/1989
DE 102004032841 A1 2/2006
DE 102004051873 A1 4/2006
EP 1352779 A 10/2003
EP 1352779 A1 10/2003

(Continued)

OTHER PUBLICATIONS

JP 2005-080740, Machine Translation, Matsushita et al., Mar. 31, 2005.*

(Continued)

*Primary Examiner* — Vinh Luong
(74) *Attorney, Agent, or Firm* — Butzel Long

(57) ABSTRACT

An actuator (1) for a vehicle includes a base (4), a covering element (5), a handle piece (6) arranged rotatably in the covering element (5), and a cable (25) with a terminal fitting (26). The actuator (1) is insertable into a metal structure of a vehicle seat backrest. The base (4) has a guiding element (32) that moves the terminal fitting (26) into an initial position for assembling the handling piece (6) to the terminal fitting (26). The guiding element (32) is between a core (24) of the cable (25) and prevents the terminal fitting (26) from rotating.

5 Claims, 5 Drawing Sheets

(56) References Cited

U.S. PATENT DOCUMENTS

| | | | |
|---|---|---|---|
| 5,107,720 A * | 4/1992 | Hatfield | 74/502 |
| 5,277,080 A * | 1/1994 | Roelle | 74/501.5 R |
| 5,307,707 A * | 5/1994 | Roelle | 74/502.6 |
| 5,497,676 A * | 3/1996 | Barnard | 74/501.5 R |
| 6,085,611 A * | 7/2000 | Valdez | 74/501.6 |
| 6,231,101 B1 * | 5/2001 | Kamida et al. | 296/63 |
| 6,318,207 B1 | 11/2001 | Asai et al. | |
| 6,349,611 B1 * | 2/2002 | Nagle et al. | 74/493 |
| 6,511,248 B2 * | 1/2003 | Wu | 403/220 |
| 6,705,178 B1 | 3/2004 | Grandjean | |
| 8,152,232 B2 * | 4/2012 | Colboch | 297/85 C |
| 2002/0145313 A1 * | 10/2002 | Alejandro | 297/183.1 |
| 2004/0163487 A1 * | 8/2004 | Martus et al. | 74/502.2 |
| 2005/0134058 A1 * | 6/2005 | Belchine et al. | 292/336.3 |
| 2012/0193963 A1 * | 8/2012 | Lutzka et al. | 297/378.13 |

FOREIGN PATENT DOCUMENTS

| | | | | |
|---|---|---|---|---|
| JP | 101081524 A | | 7/1998 | |
| JP | 10-323252 | * | 12/1998 | A47C 1/023 |
| JP | 11105606 A | | 4/1999 | |
| JP | 2002206577 A | | 7/2002 | |
| JP | 200458759 A | | 2/2004 | |
| JP | 2005080740 A | | 3/2005 | |
| JP | 2007-230276 | * | 9/2007 | B60N 2/14 |
| WO | WO 2008/080585 | * | 7/2008 | B60N 2/58 |

OTHER PUBLICATIONS

JP 2004-58759, Machine Translation, Feb. 26, 2004.*
English Abstract of JP 10-323252, Minoru, Dec. 1998.*
English Abstract of JP 2007-230276, Hirofumi et al., Sep. 2007.*

* cited by examiner

SEAT ACTUATOR

CROSS REFERENCE TO RELATED APPLICATIONS

The present application is U.S. National Stage filing of International Application No. PCT/EP2007/007198, filed on Aug. 15, 2007, titled "ACTUATOR FOR A SEAT, PARTICULARLY A MOTOR VEHICLE SEAT" which claims priority to German Patent Application No. DE 10 2006 038 649.3 filed Aug. 17, 2006 and German Patent Application No. DE 10 2006 058 388.4 filed Dec. 8, 2006, and the entire disclosures of which are incorporated herein by reference.

BACKGROUND

The disclosure relates to an actuator for a seat for a vehicle.

Actuators of this type are known in general. European Patent specification EP 1 352 779 describes, for example, an actuator for a vehicle seat, comprising a handle piece which moves a cable. In this case, the actuator is fastened to the vehicle seat in such a manner that a seat cover is clamped between two covering elements. For this purpose, the two covering elements have fastening means which engage in the seat cover. However, a disadvantage of the actuator is that, during the assembly, the cable has to be connected to the handle piece in an awkward and involved manner. Furthermore, in the case of the known actuator described, there is the risk of the seat cover tearing because of the engagement of the fastening means, since the cover is perforated during the assembly.

SUMMARY

The present disclosure relates according to an exemplary embodiment, an actuator for a vehicle, the actuator including a base, a covering element, a handle piece and a Bowden cable, wherein the Bowden cable has a terminal fitting. In addition, the base element comprises a guiding element that moves the terminal fitting into a defined initial position for assembling the handle piece to the terminal fitting. The defined initial position of the terminal fitting advantageously makes it possible to fit the handle piece on the covering element, with the terminal fitting being connected at the same time to the handle piece without an additional assembly step taking place. By this means, the assembly of the actuator is made substantially less complicated, and, in addition, the assembly time is shortened. A blind assembly of handle piece and terminal fitting is possible in this case.

A blind assembly is to be understood here since, during insertion of the handle piece into the actuator, the Bowden cable is essentially also connected at the same time to the handle piece without contact between the two parts having to be produced manually or mechanically in a further assembly step. Accordingly a separate assembly step, in which the Bowden cable is fastened to the handle piece, is unnecessary.

Further, in one exemplary embodiment, the base includes a first collar and the covering element includes a second collar. A clamping gap preferably forms during the assembly of the covering element to the base, in which a cover is clamped during the assembly. The cover, which is preferably a seat cover of a vehicle seat, is thereby connected in a form-fitting and/or frictional manner to the base and the covering element. The cover is essentially fastened along a surface, as a result of which, upon mechanical loadings, the force does not act in a spot-like manner on the cover, but rather is distributed along the surface. This prevents a possible tearing of the cover.

The following additional exemplary embodiments apply equally to the subject matter of the disclosure and to the exemplary embodiment.

In another exemplary embodiment, the base preferably has a lug and the cover has a tab with a slot. During the assembly, the tab is preferably turned over together with the slot toward the lug and the slot is pulled over the lug. This additionally fixes the cover, as a result of which the cover is connected to the base in a form-fitting and/or frictional manner. Fixing of the cover relative to the vehicle seat is achieved both by the cover being clamped along the clamping gap and by the slot being connected to the lug of the base. The fixing is form-fitting and/or frictional, with the cover essentially not having to be specially prepared or manufactured for this purpose.

In another exemplary embodiment, the guiding element is preferably furthermore designed as a guiding rib. In this case, the guiding rib has a defined height and width, with the width and the height being dependent on the terminal fitting of the Bowden cable. The Bowden cable is fitted into the base, and, upon rotation of the Bowden cable, the latter is rotated by the guiding rib into its initial orientation before it comes to rest on the base. The precise operation of the guiding element is explained in more detail in the description of the figures.

In another exemplary embodiment, the handle piece preferably has a Bowden cable holder and is rotatable about an axis. The Bowden cable holder, in turn, preferably has an undercut and/or an indentation. The terminal fitting of the Bowden cable is connected to the handle piece by means of the undercut and/or the indentation. In this case, the terminal fitting preferably enters the indentation while the handle piece is fitted onto the covering element. The connection between the terminal fitting and the handle piece is highly robust and uncomplicated to manufacture. When the handle piece is actuated, the handle piece preferably rotates about the axis and therefore moves the Bowden cable. The precise functioning is explained in the description of the figures.

In another exemplary embodiment, the covering element preferably furthermore has plug-in part. The covering element is advantageously connected by the plug-in part to the base during the assembly. The uncomplicated plug-in connection also reduces the assembly time, since, for example, screws do not have to be tightened or weld seams formed.

In another exemplary embodiment, the base preferably has a chamber and/or a latching hook and/or a latching lug and/or a sleeve. The plug-in connection of the covering element is preferably plugged into the chamber during the assembly. A form-fitting and/or frictional connection between the plug-in part of the covering element and the latching hook of the base is achieved here by the latching hook. When the base is introduced into a metal structure of the vehicle seat, the latching lug latches to the metal structure. This produces a form-fitting and/or frictional connection between the metal structure and the base. The Bowden cable is preferably guided in the sleeve, with the terminal fitting lying in the direction of the chamber.

In another exemplary embodiment, the actuator is particularly preferably provided in a vehicle seat. In this case, the actuator preferably serves as a triggering mechanism to shift a motor vehicle seat, for example from a use position into a not-in-use position. Such a not-in-use position is, for example, an easy-entry position of the vehicle seat, in which the backrest is folded toward the seat part and the vehicle seat is moved. Of course, the actuator can also be used at other locations in the vehicle, but preferably for the unlocking or locking of elements.

The actuator is preferably furthermore provided for releasing a seat adjuster. In this connection, by actuation of the handle piece, the Bowden cable is actuated, the Bowden cable preferably unlocking a recliner and thus permitting adjustment of the vehicle seat.

In another exemplary embodiment, there are disclosed methods for assembling the actuator and a method for actuating the actuator are likewise the subject matter of the present disclosure.

In one exemplary method for assembling the actuator, the base is introduced, according to the disclosure, by means of the sleeve into a metal structure of the vehicle seat. In this case, the latching lug on the sleeve latches in the metal structure of the vehicle seat, this producing a form-fitting and/or frictional connection between the base and the metal structure and therefore also to the vehicle seat. At least one Bowden cable, which comes to rest with its terminal fitting in the chamber of the base, is guided through the sleeve of the base.

In another exemplary method for assembling the actuator, the cover is pulled, according to the disclosure, over the base, the cover having a recess which lies above the chamber of the base. The tab of the cover is guided around the inner circumference of the first collar and is pushed onto the lug of the base by means of the slot. The seat cover is therefore connected to the base in a form-fitting manner and is fixed to a certain extent relative to the metal structure.

In another exemplary method for assembling the actuator, the covering element is placed, according to the disclosure, onto the base, with the plug-in part of the covering element being introduced into the chamber of the base. In this case, the latching hook of the base latches to the plug-in part, thus producing a form-fitting and/or frictional connection between the covering element and the base. The first collar of the base and the second collar of the covering element lie on each other, with a clamping gap forming between the first collar and the second collar, along which clamping gap the cover is clamped.

In another exemplary method for assembling the actuator, the handle piece is placed, according to the disclosure, onto the covering element, the terminal fitting of the Bowden cable being engaged around by the undercut of the handle piece and thereby being enclosed by the indentation of the Bowden cable holder and a ramp of the base. An extra assembly step, in which the terminal fitting is connected to the Bowden cable holder, is unnecessary.

In a method for actuating the actuator, the handle piece is preferably pivoted about the axis by a handle, with the terminal fitting, which is located in the indentation of the handle piece, being guided along the ramp in the process. By this process, the core of the Bowden cable is preferably displaced and a seat adjuster released.

The exemplary embodiments are described in more detail with reference to the figures. The descriptions here are merely by way of example and do not limit the general inventive concepts.

DETAILED DESCRIPTION

Figure 1:
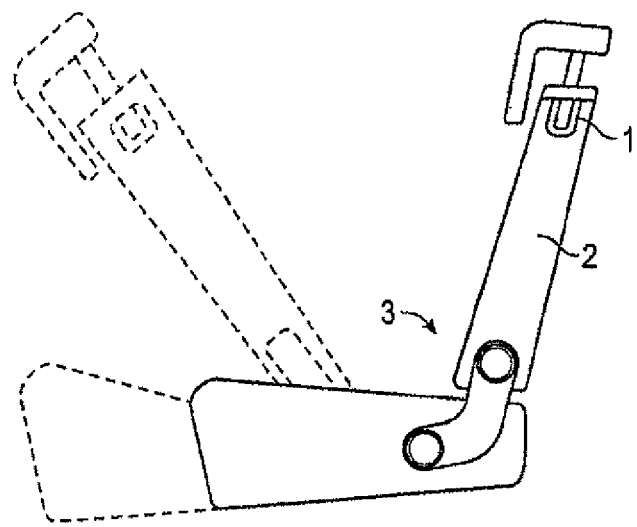
FIG. 1 schematically illustrates a vehicle seat with an actuator.

FIG. 1 schematically illustrates a vehicle seat 3 with an actuator 1. The actuator 1 is shown arranged laterally in the upper region of a backrest 2 of a vehicle seat 3. After manual operation of the actuator 1, the vehicle seat 3 can be displaced forward from a use position into a not-in-use position (illustrated by dashed lines) in which the backrest 2 is additionally pivoted into a forwardly inclined position.

Figure 2:
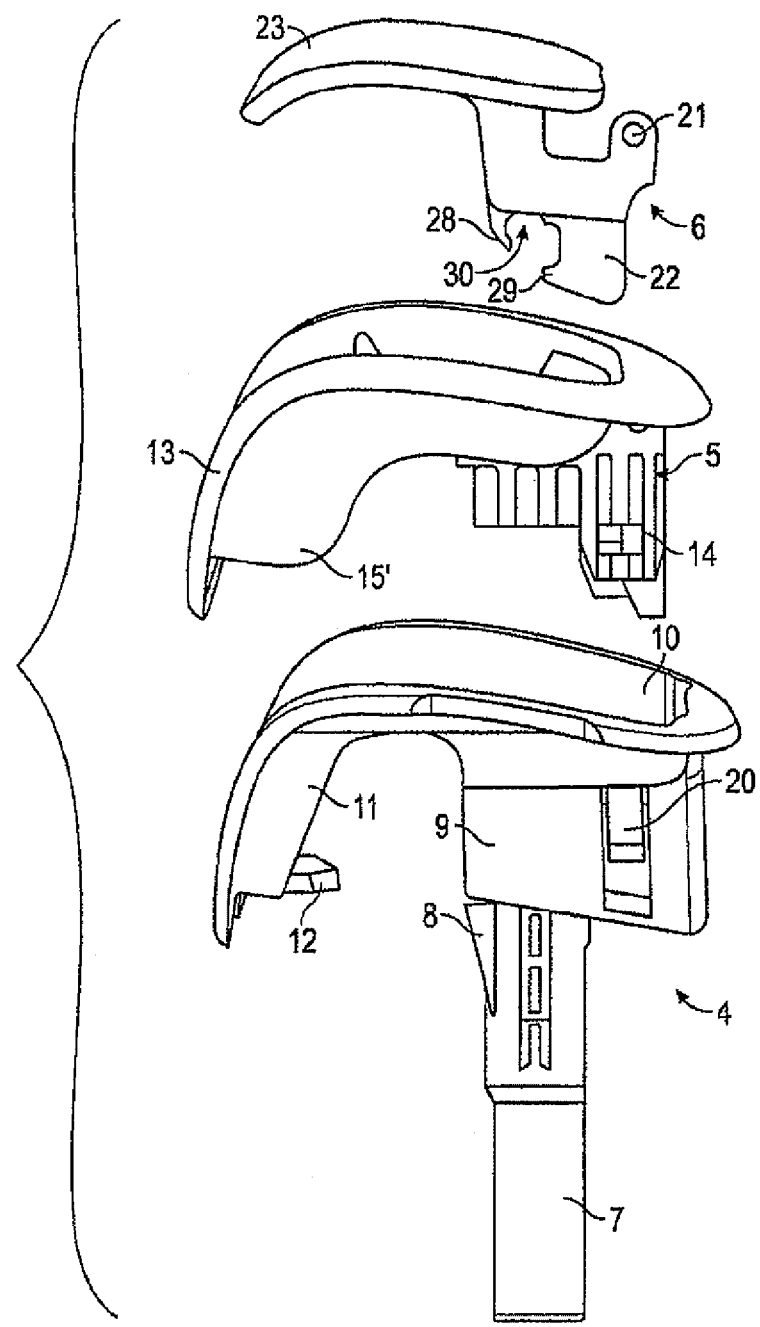
FIG. 2 schematically illustrates a base, a covering element and a handle piece.
Figure 3:
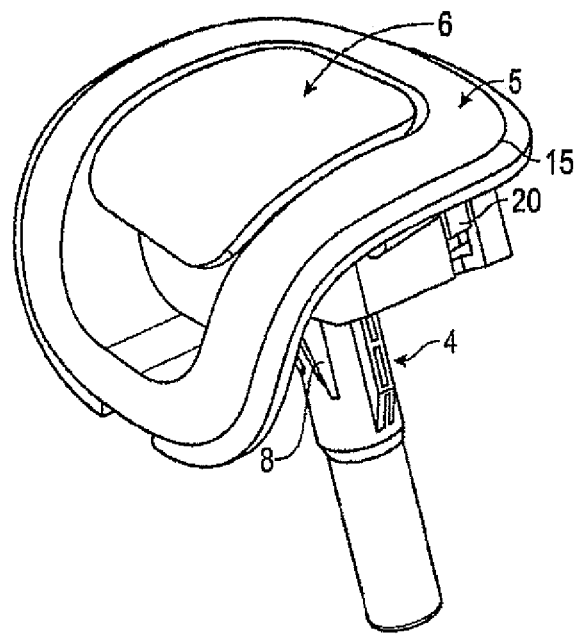
FIG. 3 schematically illustrates the base with the covering element.

FIG. 2 and FIG. 3 schematically illustrate that the actuator 1 comprises a base 4 which can be inserted into the metal structure 31 (only illustrated in FIG. 5) of the backrest 2, a covering element 5 which can be secured in the base 4, and a handle piece 6 which is arranged rotatably in the covering element 5, base, covering element and handle piece preferably being injection molded from plastic. The base 4 includes a sleeve 7 which, in the fitted state, protrudes downward through the metal structure 31 of the backrest 2, can be latched by means of a latching lug 8 in a recess of the metal structure 31 and by means of which one or more Bowden cables (provided with reference number 25 and 25' in FIGS. 5 and 6, respectively) leading to the seat adjustors can be guided in the direction of the handle piece 6. The upper region of the sleeve 7 is adjoined by a chamber 9 which is open toward the sleeve 7 and has a first collar 10 at its upper edge. The first collar 10 is generally hollowed out in the manner of a ring and, in lateral view, is of generally annular design. The base 4 subsequently engages by means of the annular design around the upper and lateral struts of the metal structure 31 of the backrest 2. A stabilizing web 11 projects from the inner circumference of the first collar 10 toward the metal structure 31 and, on the lower region of the first collar 10, forms a lug 12 which projects in the direction of the chamber 9. The covering element 5 also has an annular, encircling, second collar 13. A plug-in part 14 which can be introduced into the chamber 9 is integrally formed with the second collar 13. The plug-in part 14 of the covering element 5 is furthermore equipped with a recessed grip 15' which extends beyond the angle of the second collar 13. The collars 10 and 13 are of substantially congruent design and, when the covering element 5 is inserted into the base 4, virtually bear against each other with a minimum clamping gap 15 being formed as best shown in FIG. 3.

Figure 4:
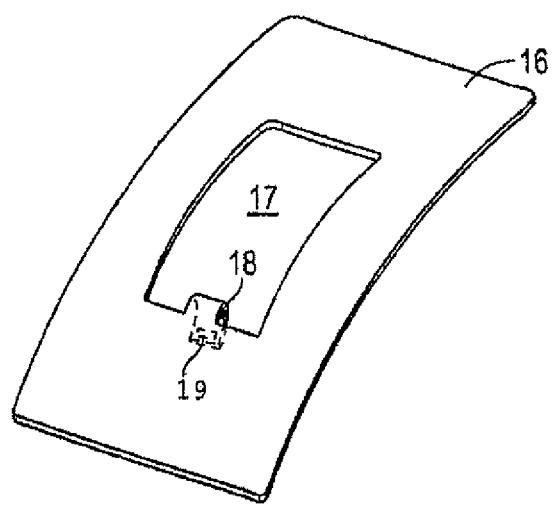
FIG. 4 schematically illustrates a cover.

FIG. 4 schematically illustrates the cover 16 which is particularly preferably a seat cover. The clamping gap 15 fixes the cover 16 which is illustrated in isolated form in FIG. 4 and, preferable after the base 4 is inserted, this cover 16 is pulled, for example, over the backrest 2. The cover 16 has a recess 17 which approximately corresponds to the inner circumference of the first collar 10 and into which a tab 18 of the cover 16 protrudes. The tab 18 is guided around the inner circumference of the first collar 10 and is pushed onto the lug 12 by means of a slot 19. The cover 16 is therefore already connected to the base 4 in a form-fitting manner and is therefore also fixed to a certain extent relative to the metal structure 31 of the backrest 2. When the covering element 5 is inserted into the base 4, the covering element 5 is held in position by means of latching hooks 20 provided in the base 4, with the cover 16 being held in a frictional manner around the recess 17 in the clamping gap 15 and also partially being held in a form-fitting manner by bearing against the recess grip 15' and the plug-in part 14.

Figure 5:
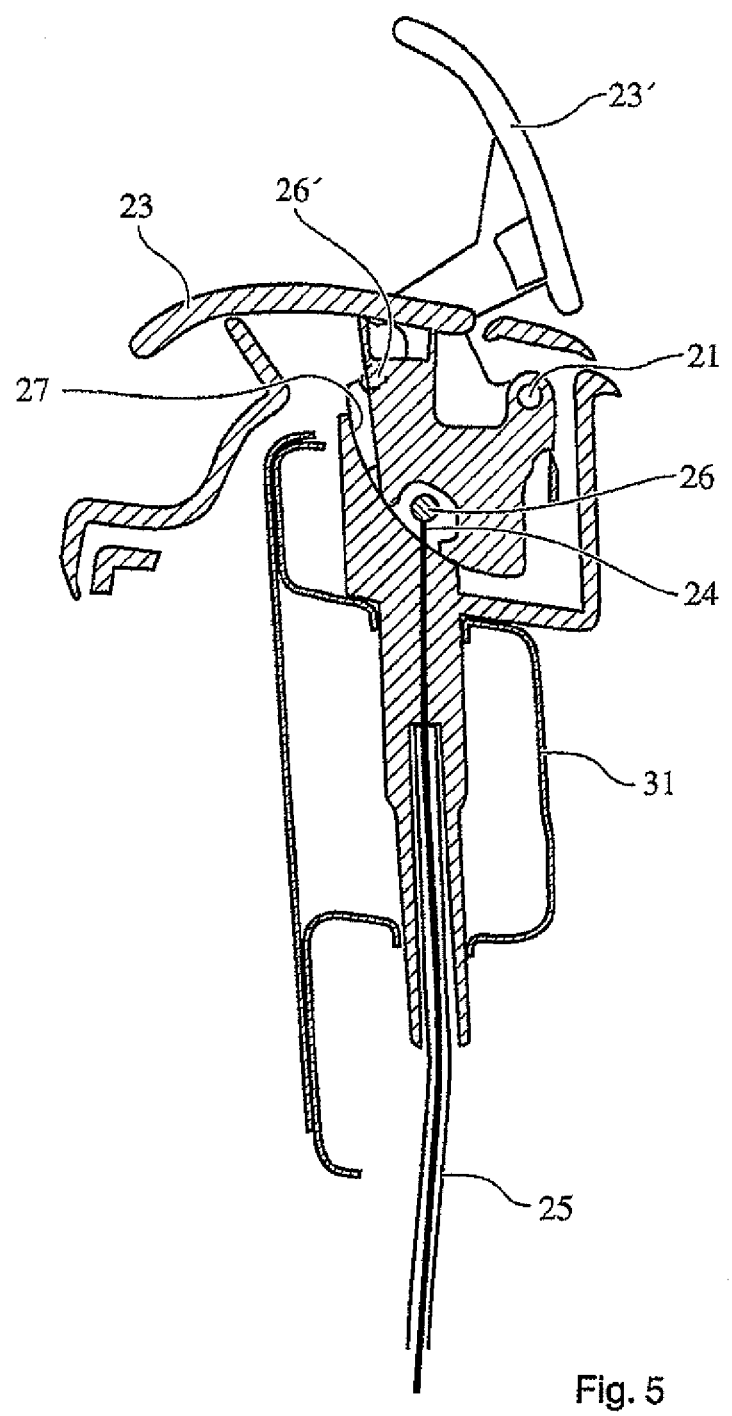
FIG. 5 schematically illustrates the actuator.

FIG. 5 schematically illustrates that the handle piece 6, preassembled together with the covering element 5, is arranged pivotably about an axis 21, with a Bowden cable holder 22 projecting into the plug-in part 14, which is designed in the manner of a chamber, of the covering element 5. In the punctuated state, the handle 23 of the handle piece 6 runs approximately flush with the upper region of the second collar 13, with it being possible for the operator to grasp the handle 23 from below from the side of the second collar 13 in the region of the recess grip 15'. As is furthermore shown in FIG. 5, the terminal fitting 26, which is barrel-shaped and is integrally formed on the core 24 of the Bowden cable 25, rests parallel to the axis 21 on a ramp 27 which is in the form of an arc (such as of a circle that runs equidistantly with respect to the axis 21). When the covering element 5 (not shown in FIG. 5) and handle piece 6 are inserted, the terminal fitting 26 is engaged around by an indentation 30 of the Bowden cable holder 22, which indentation is provided with undercuts 28, 29 (as best shown in FIG. 2), and is subsequently enclosed by the indentation 30 and the ramp 27. When the handle 23 is pivoted up, the terminal fitting 26 is guided upward along the ramp 27 (referred to in this position as handle 23' in FIG. 5 and terminal fitting 26'). By this means, the core 24 is displaced in the Bowden cable 25 and a seat adjuster actuator (or released). During a first assembly of the actuator 1, the handle 23 merely has to be folded onto the covering element 5, or the handle piece 6 fitted to the covering element 5, so that the terminal fitting 26 is connected to the handle piece 6. The Bowden cable 25 is consequently blindly assembled to the handle piece 6. A separate assembly step, in which a connection between the handle piece 6 and the terminal fitting 26 is produced manually or mechanically, is unnecessary.

Figure 6:
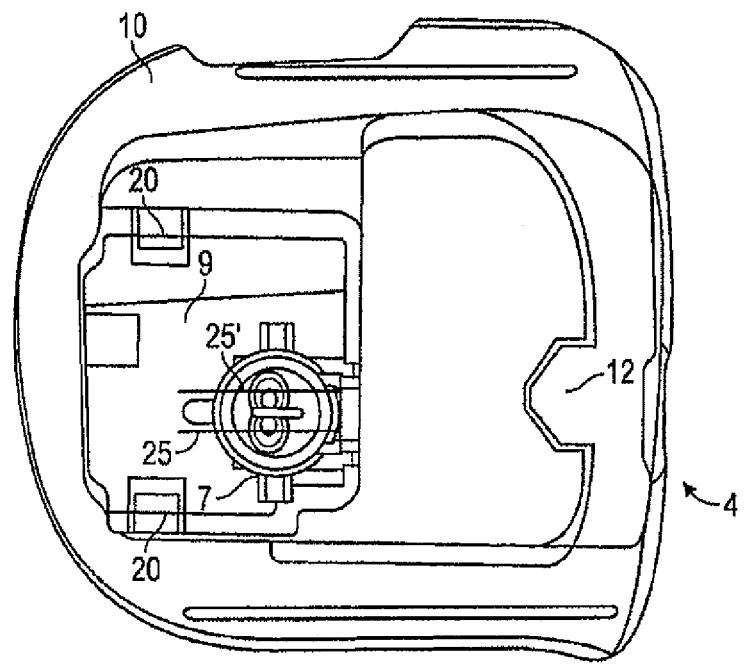
FIG. 6 schematically illustrates a top view of the actuator.

As is apparent schematically from the top view of the base 4 according to FIG. 6, a double arrangement of Bowden cables 25, 25', which have a common terminal fitting 26, can be actuated by the arrangement.

Figure 7A:
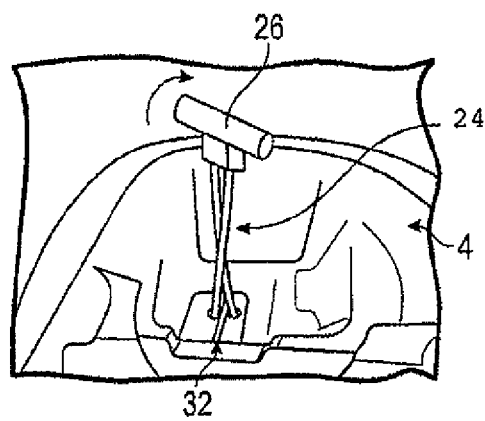
FIGS. 7A-7C illustrate the base with a guiding element and a terminal fitting.
Figure 7B:
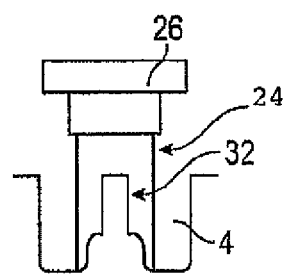
Figure 7C:
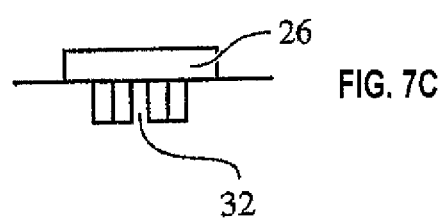

FIGS. 7A-7C schematically illustrates the base 4 with the guiding element 32. The guiding element 32 is located between the cores 24 of two Bowden cables 25 and prevents the terminal fitting 26 from rotating. If the Bowden cables 25 are rotated, the pulling of the Bowden cables 25 in the direction of the guiding element 32 causes the Bowden cables to rotate again into its proper orientation. A correct position of the terminal fitting 26 is illustrated in FIG. 7C. The terminal fitting 26 can essentially only be mounted on the base 4 in said position because of the guiding element 32. The guiding element 32 here has a defined height and width which depends on the terminal fitting 26 and the design of the base 4.

The construction and arrangement of the elements of the improved actuator for use with a vehicle seat shown is intended to be illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, the while the embodiments of the improved actuator described herein are shown as being used in combination with a vehicle seat, such actuator may also be suitable for use with other seat assemblies or used in other seat applications. Further, elements shown as integrally formed may be constructed of multiple parts or elements, the position of elements may be reversed or otherwise varied, and the nature or number of discrete elements or positions may be altered or varied, it should be noted that the elements and/or assemblies of the improved seat back frame member and recliner mechanism connection and an improved actuator may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments without departing from the scope of the present disclosure which is limited only by the understanding of a person of ordinary skill in the art.

What is claimed is:

1. An actuator being used as for releasing a seat adjuster for a vehicle seat, comprising a base, a covering element, a handle piece and a Bowden cable,
   wherein the Bowden cable has a terminal fitting, characterized in that the base comprises a guiding element that moves the terminal fitting of the Bowden cable into a defined initial position for assembling the handle piece to the terminal fitting,
   wherein the base comprises a first collar and the covering element comprises a second collar, a clamping gap forming during the assembly between the first collar and the second collar and a cover being clamped in the clamping gap,
   wherein the base has a lug and the cover has a tab with a slot, and the slot enters into a form-fitting and/or frictional connection with the lug,
   wherein the handle piece has a Bowden cable holder with an indentation having an undercut and is pivotable about an axis,
   wherein the covering element has a plug-in part,
   wherein the base has a chamber, a latching hook, a latching lug and a sleeve,
   wherein the Bowden cable has at least two cores, the guiding element being located between the two cores to let the guiding element move the terminal fitting into the defined initial position,
   wherein the base is introduced by means of the sleeve into a metal structure of a vehicle, and the Bowden cable being guided through the sleeve,
   wherein the handle piece is placed onto the covering element, the terminal fitting being engaged around by the undercut of the indentation of the Bowden cable holder and a ramp of the base,
   wherein the terminal fitting is guided along the ramp during the pivoting of the handle piece about the axis, as a result of which the two cores of the Bowden cable are displaced.

2. The actuator as claimed in claim 1, characterized in that the guiding element is a guiding rib.

3. The actuator as claimed in claim 1 installed in the vehicle seat.

4. A method for assembling the actuator as claimed in claim 1, characterized in that the cover is pulled over the base, the cover having a recess which lies above the chamber of the base, and the tab of the cover being guided around an inner circumference of the first collar and being pushed onto the lug by means of the slot.

5. A method for assembling the actuator as claimed in claim 1, characterized in that the covering element is placed onto the base, with the plug-in part of the covering element being introduced into the chamber of the base, and with a clamping gap forming between the first collar of the base and the second collar of the covering element, and the cover is clamped in the clamping gap.

* * * * *